(12) United States Patent
Erb et al.

(10) Patent No.: US 7,816,290 B2
(45) Date of Patent: Oct. 19, 2010

(54) NONWOVEN MAT, METHOD FOR PRODUCTION THEREOF AND FIBRE COMPOSITE

(75) Inventors: Wilfried Erb, Neu-Ulm (DE); Peter Übelmesser, Bayreuth (DE)

(73) Assignee: Frenzelit-Werke GmbH & Co., K.G., Bad Berneck (DE)

( * ) Notice: Subject to any disclaimer, the term of this patent is extended or adjusted under 35 U.S.C. 154(b) by 392 days.

(21) Appl. No.: 10/554,456

(22) PCT Filed: Apr. 1, 2004

(86) PCT No.: PCT/EP2004/003470

§ 371 (c)(1),
(2), (4) Date: Feb. 5, 2007

(87) PCT Pub. No.: WO2004/097111

PCT Pub. Date: Nov. 11, 2004

(65) Prior Publication Data

US 2007/0123132 A1    May 31, 2007

(30) Foreign Application Priority Data

Apr. 25, 2003  (DE)  ............................... 103 18 858

(51) Int. Cl.
*D04H 1/54* (2006.01)
*D04H 3/14* (2006.01)
*D04H 5/06* (2006.01)

(52) U.S. Cl. ..................... 442/411; 442/327; 442/409; 442/415; 264/172.19

(58) Field of Classification Search ................. 442/415, 442/327, 409, 411; 264/172.19
See application file for complete search history.

(56) References Cited

U.S. PATENT DOCUMENTS

| 4,294,657 A |  | 10/1981 | Saito et al. |
| 4,946,738 A |  | 8/1990 | Chenoweth et al. |
| 7,294,218 B2 | * | 11/2007 | Haque et al. ................. 156/148 |
| 2003/0104191 A1 | * | 6/2003 | Yokoo et al. ............. 428/296.1 |

FOREIGN PATENT DOCUMENTS

| EP | 0 774 343 A1 | 5/1997 |
| EP | 0 790 341 A2 | 8/1997 |
| EP | 1 006 237 A1 | 6/2000 |
| WO | WO 87/04476 A1 | 7/1987 |
| WO | WO 02/12619 A1 | 2/2002 |

* cited by examiner

*Primary Examiner*—Norca L Torres-Velazques
(74) *Attorney, Agent, or Firm*—Brinks Hofer Gilson & Lione

(57) ABSTRACT

The invention relates to a nonwoven mat as half-stuff which contains a high performance thermoplast as melt fiber and a reinforcing fiber, and also a method for producing a nonwoven mat of this type and fiber composites produced from the nonwoven mat.

34 Claims, 2 Drawing Sheets

NONWOVEN MAT, METHOD FOR PRODUCTION THEREOF AND FIBRE COMPOSITE

BACKGROUND

The invention relates to a nonwoven mat as half-stuff which contains a high performance thermoplast as melt fibre and a reinforcing fibre, and also a method for producing a nonwoven mat of this type and fibre composites produced from the nonwoven mat.

The production of nonwovens by the wet method in typical modes of operation derived from paper production is known in the state of the art. In "Nonwovens", Viley-VCH, Viley-VCH Press, Weinheim 2000, from page 235 ff., a method of this type is described. The method is thereby implemented such that the fibres are dispersed in water, then a continuous nonwoven formation is effected on a wire belt by filtration and subsequently compaction, drying and rolling-up of the formed nonwoven web is undertaken.

Methods of this type are used essentially for paper production, such as e.g. synthetic fibre paper, teabag paper, air filter paper or also cigarette covering papers.

The method of the state of the art was hence applied only for the production of special papers or special technical nonwovens as end product.

Moulded articles are also known from the state of the art which were formed from melt fibres and a reinforcing fibre. A moulded article is disclosed in EP 0 774 343 A1 which comprises a core layer and a cover layer, the core layer being formed from melt fibres and a reinforcing fibre. It has however been shown that this moulded article is suitable only for the purpose of use mentioned in the above European application. The moulded article according to EP 0 774 343 A1 has in fact inadequate properties with respect to density and strength and is hence limited in its applicability.

It is therefore the object of the present invention to provide a novel nonwoven mat which is suitable as half-stuff for producing fibre composites with high density. Furthermore, it is an object of the present invention to indicate a method in this respect for producing a nonwoven mat of this type. The method is intended furthermore to have great variability, with respect to the usable components and the properties which can be achieved therewith.

SUMMARY

According to the present invention, a nonwoven mat is hence proposed which contains at least one first fibre made of a high performance thermoplast as melt fibre and at least one second fibre as reinforcing fibre made of a high performance material. The individual fibres are fixed in the nonwoven mat by means of a binder. In the case of the subject of the present invention, it is essential that, in the nonwoven mat, the melt fibres have a smaller fibre length than the reinforcing fibre. The melt fibre is thereby contained with a weight proportion of 30 to 90% by weight and the reinforcing fibre in the nonwoven mat with a weight proportion of 10 to 70% by weight.

As a result of the fact that the fibre length of the melt fibre is smaller than that of the reinforcing fibre, a homogeneous mixing of the two types of fibre is achieved so that, in the case of subsequent further processing of the half-stuff, a uniform homogeneous distribution of the reinforcing fibre in the fibre composite is then achieved. The fibre orientation of the fibres in the layer can be isotropic and/or anisotropic.

In the case of the method according to the invention, it is therefore preferred if the melt fibre is 0.1 mm to 30 mm, preferably 2 mm to 6 mm and very particularly preferred 2.5 mm to 3 mm. Furthermore, it should be ensured that as uniform a fibre length as possible is present so that as homogeneous a distribution as possible of the melt fibre in the nonwoven mat can also be achieved. The reinforcing fibre made of the high performance material can likewise have a length of 0.1 mm to 30 mm but, as is defined by patent claim 1, is respectively always larger than the melt fibre. A suitable fibre length for the reinforcing fibres is 6 mm to 18 mm, particularly preferred 6 mm to 12 mm. In the case of the reinforcing fibre, it should also be ensured that as uniform a fibre length as possible is present.

From the point of view of material, the invention includes all the fibres known in the state of the art with respect to the melt fibre, said fibres being producible from a high performance thermoplast. Examples of fibres of this type are fibres made of polyether etherketone (PEEK), poly-p-phenylene sulphide (PPS), polyether imide (PEI) or polyether sulphone (PES) and/or mixtures thereof.

In the case of the reinforcing fibres those which are producible from high performance materials can be used. Examples of these are fibres made of polybenzoxazole (PBO), polyimide (PI), polybenzimidazole (PBI), metal fibres, glass fibres, aramide fibres, carbon fibres, ceramic fibres, natural fibres and/or mixtures thereof.

As already explained above, the nonwoven mat according to the invention is constructed such that the individual fibres are fixed together by means of a binder. The fibres themselves are thereby still present just as they were at the outset and are bonded to each other by the binder merely at the intersection points or at the contact points. This construction of the nonwoven mat is important since, for the composite material to be produced subsequently, splaying apart of the reinforcing fibres and/or non-homogeneous mixture must be avoided.

The binder itself can thereby be a binder which acts physically and/or by glueing.

If a physically acting binder is used, a binding effect is achieved by cramping/hooking of the fibres by the binder. For this reason, filaments, fibrids and/or fibrous binders are suitable as binders.

The advantage of a binder of this type resides in the fact that essentially it does not have to be removed from the system during the subsequent further processing under pressure and temperature but instead stays retained in the finished material and thus the properties of the material can also be specifically controlled.

The melt-bonding binders (Thermobonding) are chosen such that their melting point is below that of the melt fibre and hence a bonding effect is thus produced.

In the case of the binders, those can be used according to the present invention based on polyvinyl alcohol (PVA), polyvinyl acetate (PVAC), ethylene vinyl acetate (EVA), polyacrylate, polyurethane (PUR), resins, in particular for example melamine resin or phenol resin, polyolefins such as polyethylene (PE), polypropylene (PP), aromatic polyamides (aramides) and copolymers thereof.

The binder can be a dispersion or have the form of filaments, fibrids or have a fibre-like character. In the case of a binder of this type, the geometry can vary with respect to the length/width/height ratio for each individual parameter in the ratio relative to each other in the range of 1:1 to 1:100,000.

The nonwoven mat according to the invention can of course also contain additives in addition. Those additives can be used in order to influence the properties of the nonwoven mat and hence also subsequently those of the fibre composite produced with the nonwoven mat. According to the present invention, additives can therefore be used which affect the properties, such as electrical conductivity, heat conductivity, frictional behaviour, temperature resistance, impact strength, strength or abrasion resistance. Additives of this type can be used for example in the form of fibres, filaments, fibrids or pulps. The additives can be PTFE fibres or powder, PI fibres, aramide fibres, carbon fibres or metallic and/or ceramic and also organic powder. Nanoscale C-fibres are particularly suitable. The nonwoven mat can therefore also function as a functional layer.

It is now essential that the nonwoven mat according to the invention has a very low basis weight. Furthermore, the high uniformity of the sheet material in the longitudinal and transverse direction with respect to the thickness is characteristic. According to the reinforcing fibres and melt fibres which are used and the weight proportions thereof, the nonwoven mat can have a basis weight of 8 to 400 g/m$^2$, preferably 50 to 150 g/m$^2$ and a density of 30 to 500 kg/m$^3$, preferably 100 to 200 kg/m$^3$. The nonwoven mat according to the invention is preferably 0.1 mm to 4 mm, particularly preferred 0.5 mm to 2 mm thick. The low basis weight makes it possible for very thin moulded articles to be produced in the subsequent compaction process.

The nonwoven mat according to the invention can furthermore be constructed also such that a flat substrate is applied on at least one outer side of the nonwoven mat. This has the advantage that this flat substrate can be configured for example also as a functional layer and, in the further processing procedure, i.e. when the half-stuff is processed into an end product, this functional layer can then also take over specific functions, such as conductivity or also a special glueing function. The flat substrate can thereby be configured in the form of a woven fabric, plaited fabric, paper or nonwoven. A further alternative of the nonwoven mat according to the invention provides that at least two nonwoven mats are disposed one above the other, i.e. that a further nonwoven mat serves as flat substrate so that then a composite of two nonwoven mats is present.

The invention relates furthermore to a method for producing a nonwoven mat as described above. The method according to the invention provides that the melt fibre and the reinforcing fibre are dispersed in a dispersion agent, preferably water, and that a continuous nonwoven formation is effected on a wire belt by filtration and subsequently compaction and drying of the nonwoven is effected. The binder can thereby be added during the dispersion step and/or during the nonwoven formation.

As is known per se from the state of the art already, the method according to the invention is implemented with a diagonally running wire.

It is preferable furthermore if the binder is added in the form of a dispersion. The addition of the binder can thereby be effected both during the dispersion step and during the nonwoven formation.

Equally, it is possible to add the additives during the dispersion step or during the nonwoven formation.

It is an advantage of the method according to the invention that the basis weight, the density and thickness of the nonwoven can be controlled by the material composition of the dispersion and/or the supply speed of the dispersion towards the diagonal wire and/or the transport speed thereof. It is consequently possible now to produce nonwoven mats with a basis weight, as described above, of 8 to 400 g/m$^2$ and a density of 30 to 500 kg/m$^3$. It is essential, in the case of the method according to the invention, that a homogeneous mixture is made available in the form of a dispersion of the educts so that a homogeneous distribution of the types of fibre, melt fibre and reinforcing fibre is then achieved during accumulation of this dispersion on the wire. In the case of the method according to the invention, it was particularly surprising that the nonwoven mat produced with the fibres described above has excellent stability. Consequently, it is now possible to process this nonwoven mat in further processing steps into an end product.

In order to produce a nonwoven mat which also has a flat substrate on at least one outer side, it is provided that the nonwoven formation is effected with sheet materials placed on the diagonal wire. These sheet materials can be a plaited fabric, woven fabric or a nonwoven.

The fibre composite of the present invention is distinguished in particular in that the reinforcing fibre with a weight proportion of 30 to 90% by weight relative to the weight proportion of the composite material is distributed homogeneously in the material. The orientation of the fibre in the matrix of the fibre composite can be isotropic and/or anisotropic. The fibre length of the fibres in the fibre composite is thereby 0.1 mm to 30 mm, preferably 6 mm to 18 mm, very particularly preferred 6 mm to 12 mm. The fibres are thereby selected from fibres made of high performance materials, as are known in the state of the art. Reference is made in this respect to the description of the nonwoven mat.

The matrix of the fibre composite according to the invention is formed preferably from a high performance thermoplast. From the point of view of materials, the high performance thermoplasts can be used, as likewise described above already in the case of the nonwoven mat.

It is now essential that the fibre composite according to the present invention has a density which is between 0.25 and 6 g/cm$^3$. It was shown that the density which can be achieved with the fibre composites according to the invention is between 30 and 100% of the maximum achievable density which is calculated from the density of the individual initial materials, i.e. the reinforcing fibres and the matrix. As a result, for the first time a high performance material is now available which is comparable in its properties to metallic materials. The material could hence also be described as plastic sheet metal.

The fibre composite according to the present invention is present preferably in the form of a flat structure but can of course then be shaped into three-dimensional structures. The thickness of the fibre composite in the form of the flat structure is preferably between 0.01 to 0.2 mm.

The fibre composite according to the invention can furthermore have another functional layer. This functional layer is present at least on one side of the fibre composite according to the invention.

The fibre composite according to the invention can be produced preferably by compaction of at least one non-woven mat in a heated tool Suitable pressures in this respect are 0.05-15 N/mm$^2$. The density of the fibre composite to be produced can be adjusted according to the pressure applied and the reinforcing fibres used.

BRIEF DESCRIPTION OF THE DRAWINGS

The invention is explained in more detail subsequently with reference to production examples and Figures.

DESCRIPTION OF EXAMPLES

Example 1

Production Example of a Nonwoven Mat

A nonwoven was produced by way of example under VP00054.

| | |
|---|---|
| PPS cut length 3 mm | 81% by weight |
| carbon fibre cut length 6 mm | 19% by weight |
| relative to: | |
| binding fibre PVA 4 mm | 10% by weight |
| Basis weight: | 128 g/m² |
| Thickness: | 0.95 mm |
| Density: | 0.135 g/cm³ |

Example 2

Production Example For Fibre Composite

From this nonwoven, consolidated fibre composites were produced:

Single-Layer Compaction

| | |
|---|---|
| Compaction temperature: | 350° C. |
| Surface pressure: | 3.3 N/mm2 |
| Thickness: | 110 μm |
| Density: | 1.17 g/cm³ |

Figure 1:
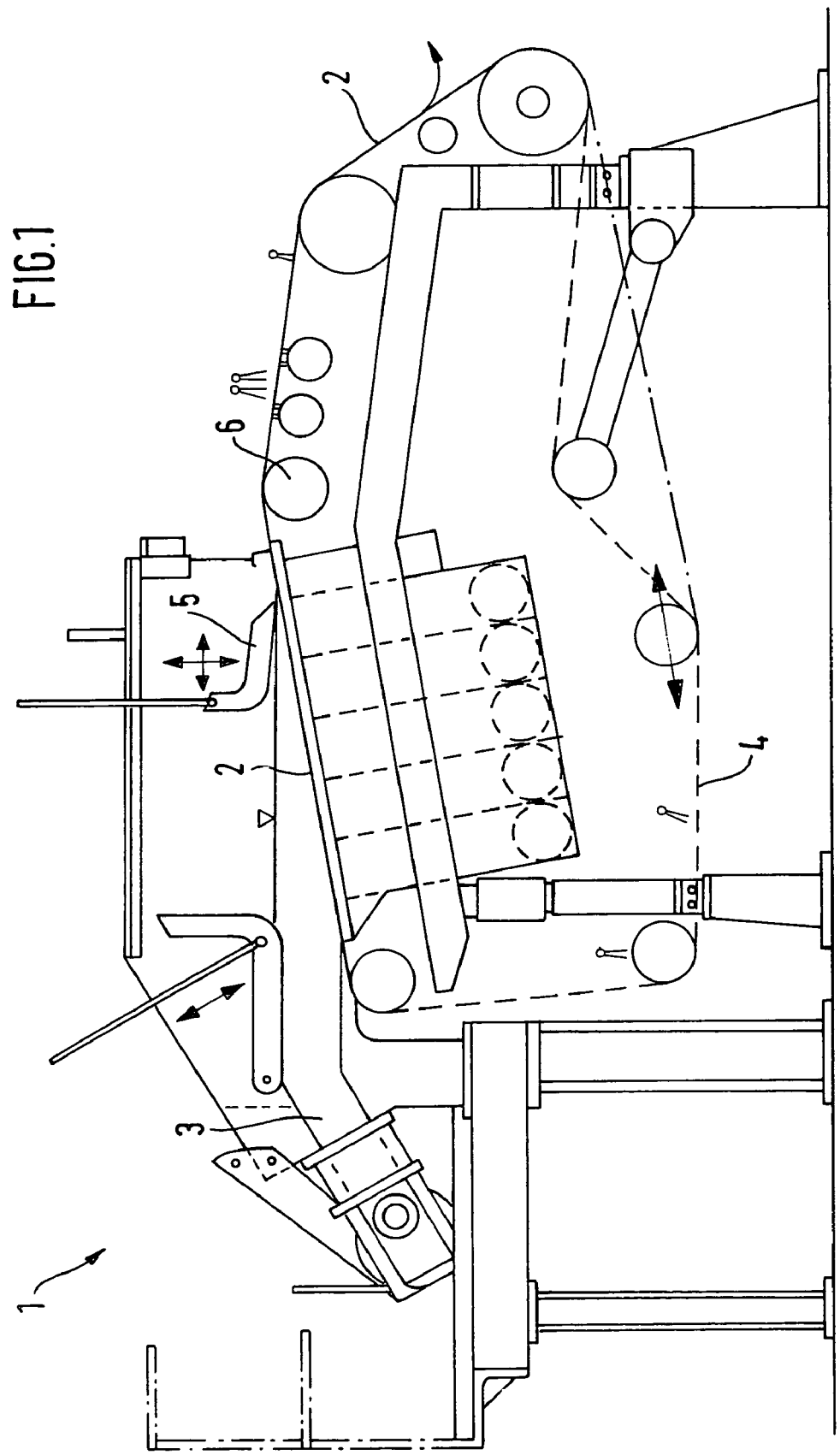
FIG. 1 thereby shows the diagrammatic representation of a device for producing the nonwoven mat.

FIG. 1 shows the diagrammatic representation of a diagonal wire unit as was used for producing the nonwoven mat according to the invention. The device 1 thereby comprises a diagonally running wire 2 and also a horizontal supply mechanism 3 with which the dispersion of the melt fibres and the reinforcing fibres is supplied to the diagonally running wire 2. The diagonally running wire 2 is thereby configured such that dewatering is possible. A corresponding collection container 4 is provided for this purpose. A corresponding device 5 which is adjustable is disposed for controlled thickness adjustment in order to produce the thickness of the nonwoven. The dispersion comprising the fibres, as explained above, is guided over the horizontal channel 3 to a revolving belt which is directed via rollers 6. After supply of the dispersion, the nonwoven is guided over a drying mechanism 7 in order to ensure binding of the individual fibres with the binder. The thus produced nonwoven mat is then removed.

Figure 2:
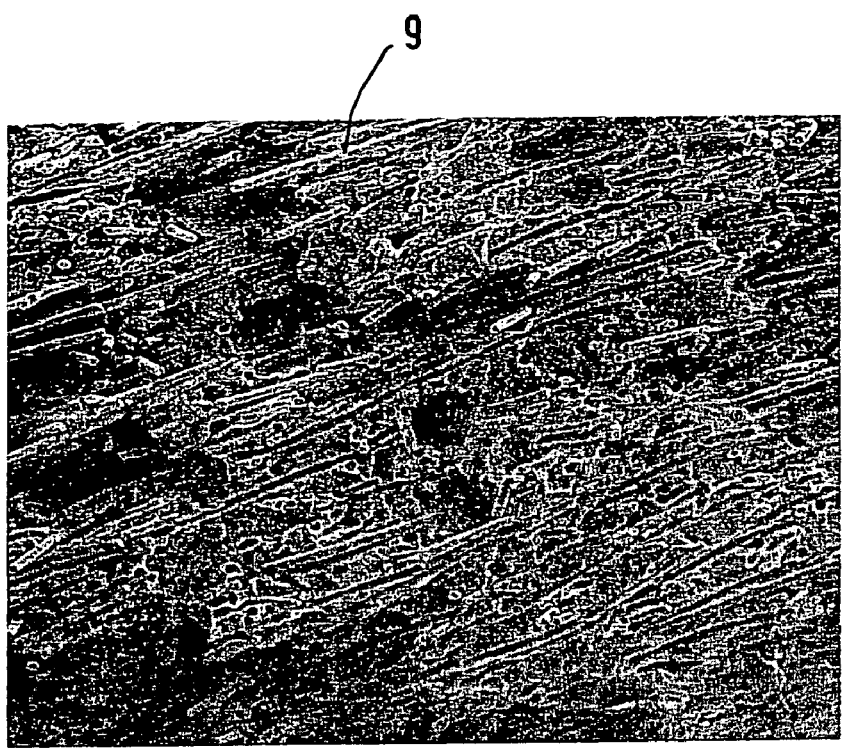
FIGS. 2 and 3 show electron microscopic images of a fibre composite according to the invention.
Figure 3:

FIGS. 2 and 3 show electron microscopic images of a fibre composite according to the invention. The fibre composite according to FIGS. 2 and 3 is a composite material which was produced from a nonwoven mat comprising glass fibres as reinforcing fibres and PPS fibres as melt fibres. As the electron microscopic images of FIGS. 2 and 3 show, the reinforcing fibre 9 is distributed homogeneously in the thermoplast matrix. It also emerges from FIGS. 2 and 3 that the corresponding fibres are present virtually unchanged, in particular not shortened. This contributes decisively to the increase in the modulus of elasticity and in particular to the tensile strength of the material in comparison to purely unreinforced thermoplast films.

The invention claimed is:

1. A non-woven mat as an intermediate product for a fibre thermoplastic composite comprising a first fibre made of a thermoplast with a fibre length of between 0.1 mm to 6 mm and having a weight proportion of 30% to 90%, and a reinforcing fibre with a fibre length of 6 mm to 30 mm, the temperature stability of the reinforcing fibre being greater than that of the first fibre and having a weight proportion of 70% to 10%, the first fibre and the reinforcing fibre being bonded merely at the intersection or contact points with 1% to 10% by weight of a binder, the weight proportions being relative to the entire formulation of the non-woven mat, the fiber length of the first fibre being smaller than that of the reinforcing fibre, the non-woven mat having a weight of between 8 g/m² and 400 g/m².

2. A non-woven mat according to claim 1, wherein the length of the first fibre is between 2 mm and 6 mm.

3. A non-woven mat according to claim 2, wherein the length of the first fibre is between 2.5 mm and 3.5 mm.

4. A non-woven mat according to claim 3, wherein the length of the reinforcing fibre is between 6 mm and 18 mm.

5. A non-woven mat according to claim 1, wherein the length of the reinforcing fibre is between 6 mm and 18 mm.

6. A non-woven mat according to claim 5, wherein the length of the reinforcing fibre is between 6 mm and 12 mm.

7. A non-woven mat according to claim 1, wherein the first fibre is selected from polyether etherketone, poly-p-phenylene sulphide, polyether imide, polyether sulphone, and mixtures thereof.

8. A non-woven mat according to claim 1, wherein the reinforcing fibre is selected from glass fibre, aramide fibre, carbon fibre, ceramic fibre, metal fibre, polyimide fibre, polybenzoxazole fibre, natural fibre, and mixtures thereof.

9. A non-woven mat according to claim 1, wherein the binder is selected from compounds which are constructed based on polyacrylate, polyvinyl acetate, polyvinyl alcohol, polyurethane, resins, polyolefins, aromatic polyamides, and copolymers or mixtures thereof.

10. A non-woven mat according to claim 9, where the binder form is selected from filaments, fibrids, and fibrous binders, and the geometry of the binder has an aspect ratio in the range of 1:1 to 1:100,000.

11. A non-woven mat according to claim 1, further comprising additional additives.

12. A non-woven mat according to claim 11, wherein the additives are selected from tribological additives, additives made from fibres, filaments, fibrids, pulps, metallic or ceramic powder, organic powder, and mixtures thereof.

13. A non-woven mat according to claim 12, wherein the additives are selected from polytetrafluoroethylene fibres or powder, polyimide fibers, aramide fibres, carbon fibres or powder, and metal powder.

14. A non-woven mat according to claim 1, wherein the mat has a density of between 30 kg/m³ and 500 kg/m³.

15. A non-woven mat according to claim 1, wherein the mat has a thickness of 0.1 mm to 4 mm.

16. A non-woven mat according to claim 1, further comprising a flat substrate applied to at least one outer surface of the mat.

17. A non-woven mat according to claim 16, wherein the flat substrate is in the form of a woven fabric, plaited fabric, paper or another non-woven mat.

18. A non-woven mat according to claim 1, wherein the first fibre and the reinforcing fibre are both distributed homogeneously throughout the mat.

19. A non-woven mat according to claim 1, wherein the first fibre or the reinforcing fibre are distributed inhomogeneously throughout the mat.

20. A method for producing a non-woven mat for a fibre thermoplastic composite, the mat having a first fibre made of a thermoplast with a fibre length of between 0.1 mm to 30 mm and having a weight proportion of 30% to 90%, and a reinforcing fibre with a fibre length of 0.1 mm to 30 mm, the temperature stability of the reinforcing fibre being greater than that of the first fibre and having a weight proportion of 70% to 10%, the first fibre and the reinforcing fibre being bonded merely at the intersection or contact points with 1% to 10% by weight of a binder, the weight proportions being relative to the entire formulation of the non-woven mat, the fiber length of the first fibre being smaller than that of the reinforcing fibre, the non-woven mat having a weight of between 8 g/m² and 400 g/m², the method comprising the steps of:

dispersing said first fibre and said reinforcing fibre in a dispersion medium, filtering the fibre containing dispersion medium through a diagonally running wire belt to form a filtrate, compacting the filtrate to form a web, drying the web, and adding said binder to either the dispersion medium or to the filtrate.

21. The method of claim 20, wherein the binder is added in the form of fibres in a dispersion agent.

22. The method of claim 20, further comprising a step of introducing additives in the form of fibres or powders to said non-woven mat.

23. The method of claim 22, wherein the introducing step is performed during said dispersing or filtering steps.

24. The method of claim 20, further comprising the steps of controlling the composition and supply speed of said dispersions toward the wire belt, and controlling the speed of the belt to achieve a desired weight or the thickness of the mat.

25. The method of claim 20, further comprising a step of placing a sheet material on the diagonal wire belt.

26. The method of claim 25, wherein the sheet material is selected from a plaited fabric, woven fabric or another non-woven mat.

27. A fibre thermoplastic composite produced from a non-woven mat, the mat comprising a fibre matrix made of a first fibre thermoplast with a fibre length of between 2 mm to 6 mm and having a weight proportion of 30% to 90%, and a reinforcing fibre with a fibre length of 6 mm to 18 mm, the temperature stability of the reinforcing fibre being greater than that of the first fibre thermoplast and having a weight proportion of 70% to 10%, the first fibre thermoplast and the reinforcing fibre being bonded merely at the intersection or contact points with 1% to 10% by weight of a binder before melting of said first fibre thermoplast, the weight proportions being relative to the entire formulation of the non-woven mat, the fiber length of the first fibre thermoplast being smaller than that of the reinforcing fibre, the non-woven mat having a weight of between 8 g/m² and 400 g/m², wherein, after melting of said first fibre thermoplast, the reinforcing fibre is oriented anisotropically in the fibre thermoplastic composite matrix, the fibre thermoplastic composite having a density of 0.25 g/cm³ to 6 g/cm³.

28. The fibre thermoplastic composite of claim 27, wherein the reinforcing fibre is selected from glass fibres, aramide fibres, carbon fibres, ceramic fibres, and mixtures thereof.

29. The fibre thermoplastic composite of claim 27, wherein the matrix thermoplast is selected from polyether etherketone, poly-p-phenylene sulphide, polyether imide and polyether sulphone.

30. The fibre thermoplastic composite of claim 27, wherein the density of the fibre thermoplastic composite is 30% to 100% of the maximum achievable density calculated from the densities of the matrix materials and reinforcing fibres.

31. The fibre thermoplastic composite of claim 27, further comprising a functional layer on at least one side of the composite.

32. The fibre thermoplastic composite of claim 27, wherein the composite has a total thickness of between 0.01 mm and 1.6 mm.

33. The fibre thermoplastic composite of claim 27 produced by the co-compaction of at least two of said non-woven mats.

34. The fibre thermoplastic composite of claim 33 wherein the co-compaction is achieved at a pressure of 0.05 N/mm² to 15 N/mm².

* * * * *